US008114314B2

(12) United States Patent
Kotaki et al.

(10) Patent No.: US 8,114,314 B2
(45) Date of Patent: Feb. 14, 2012

(54) ELECTROCONDUCTIVE CURABLE RESINS

(75) Inventors: Masaya Kotaki, Singapore (SG); Ke Wang, Singapore (SG); Chaobin He, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 385 days.

(21) Appl. No.: 11/996,067

(22) PCT Filed: Jul. 20, 2006

(86) PCT No.: PCT/SG2006/000204
§ 371 (c)(1),
(2), (4) Date: Dec. 2, 2008

(87) PCT Pub. No.: WO2007/011313
PCT Pub. Date: Jan. 25, 2007

(65) Prior Publication Data
US 2009/0127516 A1 May 21, 2009

(51) Int. Cl.
H01B 1/00 (2006.01)
H01B 1/06 (2006.01)
H01B 1/22 (2006.01)

(52) U.S. Cl. .......................... 252/500; 252/511; 252/512

(58) Field of Classification Search .................. 252/510, 252/511, 500, 512
See application file for complete search history.

(56) References Cited

U.S. PATENT DOCUMENTS

| 4,568,592 A * | 2/1986 | Kawaguchi et al. .......... 428/107 |
| 5,213,736 A | 5/1993 | Sumita et al. |
| 6,528,572 B1 | 3/2003 | Patel et al. |
| 6,811,917 B2 * | 11/2004 | Fitts et al. .................. 429/518 |
| 2003/0181568 A1 | 9/2003 | Amarasekera et al. |
| 2005/0070658 A1 | 3/2005 | Ghosh et al. |
| 2005/0119371 A1 * | 6/2005 | Drzal et al. .................. 523/400 |
| 2005/0121653 A1 * | 6/2005 | Chacko ........................ 252/500 |

FOREIGN PATENT DOCUMENTS

| EP | 1 398 300 A1 | 3/2004 |
| EP | 1 526 152 A1 | 4/2005 |
| JP | 2003-012939 A | 1/2003 |
| JP | 2004-047174 A | 2/2004 |
| JP | 2004-055609 A | 2/2004 |

(Continued)

OTHER PUBLICATIONS

Johnson et al., "Dispersion and film properties of carbon nanofiber pigmented conductive coatings," Progress in Organic Coatings, 47, pp. 198-206 (2003).*
Butzloff et al., "Hybrid Montmorillonite + Multi-Walled Carbon Nanotube Nanocomposites", *47th International SAMPE Symposium*, 47:1801-1811 (2002), XP001135052.

(Continued)

*Primary Examiner* — Mark Kopec
*Assistant Examiner* — Jaison Thomas
(74) *Attorney, Agent, or Firm* — Tarolli, Sundheim, Covell & Tummino LLP

(57) ABSTRACT

An electroconductive polymer composition comprises a curable liquid thermosetting resin matrix; conductive nano-fibers such as carbon nano-tubes, carbon nano-fibers, metallic nano-fibers or non-conductive nano-fibers with an electrically conductive coating; and a particulate non-conductive phase discontinuously dispersed throughout the thermosetting matrix. The conductive nano-particles are dispersed throughout the matrix whereby when the thermosetting resin is cured, a percolation threshold is established within the thermoset matrix. The particulate non-conductive phase is selected from thermoplastic resin powders or exfoliated particles of nano-clay intercalated with the liquid thermosetting resin.

19 Claims, 4 Drawing Sheets

FOREIGN PATENT DOCUMENTS

| | | | |
|---|---|---|---|
| JP | 2004-300244 | A | 10/2004 |
| WO | WO 01/95344 | A1 | 12/2001 |
| WO | WO-03/078315 | A2 | 9/2003 |
| WO | WO-2004/106420 | A2 | 12/2004 |
| WO | WO-2004/106420 | A3 | 12/2004 |
| WO | WO 2006/037949 | * | 4/2006 |

OTHER PUBLICATIONS

Song et al., "Influence of Dispersion States of Carbon Nanotubes on Physical Properties of Epoxy Nanocomposites", *Carbon*, 43:1378-1385 (2005), XP004871038.

* cited by examiner

ELECTROCONDUCTIVE CURABLE RESINS

FIELD OF THE INVENTION

This invention is concerned with electroconductive curable polymer compositions containing an electrically conductive filler.

The invention is concerned particularly, although not exclusively, with an electroconductive curable polymer composition containing a particulate non-conductive component selected from a thermoplastic resin or an exfoliated nano-clay dispersion.

BACKGROUND OF THE INVENTION

Plastics compositions find a wide range of industrial applications because of good strength to mass ratios combined with ease of processability and ready availability. Depending upon the properties sought in a plastics article, a wide range of polymeric species is available with vastly differing physical properties. The properties of a polymeric species, in turn, can be modified by the addition to or the incorporation in the polymeric species of modifiers such as fillers and reinforcing agents, antioxidants, mould release agents, UV stabilizers, pigments, lubricants, plasticizers, impact modifiers, flame retardants and the like.

In the formulation of plastics compounds there are usually finite and practical limitations to which the physical properties of a particular polymeric species can be modified before economic benefits and/or deterioration of other physical properties becomes a consideration. For example, it is known that the addition of a carbon black filler to rubber polymers initially contributes greatly to physical strength but beyond certain limits those strength properties are reduced. Similarly, the incorporation of fillers such as calcium carbonate, glass fibres or the like to thermoplastic resins becomes uneconomical after a relatively small increase in the specific gravity of the compounded plastics material.

Generally speaking, most plastics compositions are inherently good electrical insulators. In some cases however, it is desirable for plastics articles to exhibit a degree of electrical conductivity to dissipate electrostatic charges in electronic devices such as mobile telephones, portable computers and the like to avoid potentially damaging electrostatic discharges.

Finely divided carbon black is probably the best known additive to improve electrical conductivity in plastics compositions. While inexpensive, a relatively large quantity of carbon black needs to be incorporated into polymers to achieve any appreciable level of conductivity. In many cases, the quantity of carbon black required to achieve a useful degree of conductivity is sufficient to substantially degrade physical properties such as impact and tensile strength and Young's modulus. Moreover, as the "wettability" of carbon black by some polymers, particularly polyolefins, is poor, this leads to poor dispersion which can give rise to surface blemishes delamination, surface degradation and otherwise reduced physical properties.

Of more recent times, it has been proposed to utilize carbon nano-particles as electroconductive fillers. These nano-particles typically have sub-micron dimensions and are selected from vapour grown carbon fibres (VGCF) or carbon nano-tubes (CNT). While very effective as conductive fillers, these carbon nano-particles are much more expensive than carbon black fillers. For example, VGCF fillers are about twenty times the cost of carbon black fillers, whereas CNT fillers are from 10-1000 times the cost of VGCF fillers.

J Sandler et al (Polymer, 40, (1999) 5967) indicated that in order to avoid electrostatic charging of an insulating matrix, an electrical conductivity of $\sigma=10^{-6}$ $\Omega$m (or a resistivity of $\rho=10^6$ $\Omega$m) was required. By incorporating carbon nano-tubes into an epoxy resin matrix with intense stirring, a matrix conductivity of $\sigma=10^{-2}$ $\Omega$m was reported with filler volume fractions as low as 0.1 vol %.

Jun Xu et al (Composites: Part A, 35 (2004) 693) reported that vinyl ester resin based composites with 8% VGCF content showed a resistivity of $\rho=10^2$ $\Omega$m and a percolation threshold pc between 2-8 wt % of VGCF.

In other journal articles, K. Logano et al (Journal of Applied Polymer Science, 80 (2001) 1162) reported that 15-20 wt % was required to be incorporated into a polypropylene (PP) matrix to achieve a volume resistivity of $\rho=10^6$ $\Omega$m, while S. A. Gordeyev et al (Physica B, 279 (2000) 33) reported that the percolation threshold for PP/VGCF composites was about 4-5 vol %.

Japanese Publication Number JP 2004-300244A described epoxy-based composite thin sheets with a volume resistivity of $\rho=10^0$ $\Omega$m or less with a VGCF content of 13 wt % in the presence of a carboxy terminated butadiene acrylonitrile (CTBN) rubber phase. This is a solvent based system suitable for thin film applications.

U.S. Pat. No. 6,528,572 discloses a conductive composition comprising a polymeric resin, an electrically conductive filler selected from carbon fibres, VGCF and CTN fillers, carbon black, conductive metal fillers, conductive non-metal fillers and the like or mixtures thereof and an incompatible antistatic agent in the form of a block copolymer.

U.S. Pat. No. 5,213,736 describes a process for making an electroconductive polymer composition having a matrix comprising a mixture of incompatible polymers wherein VGCF is preferentially distributed predominantly throughout one of the polymers which exhibited a higher affinity for VGCF.

United States Patent Application Publication No US 2003/0181568 A1 discloses a conductive plastics composition comprising a thermoplastics resin to which is added either carbon powder (up to 25 wt %) or glass fibres (up to 50 wt %) or a combination of both and VGCF filler (up to 30 wt %). At 15 wt % of glass fibre filler, surface resistivities of from $10^5$ to $10^9 \Omega$ were obtained while at 20 wt % of glass fibre filler, surface resistivities in the range of from $10^7$ to $10^{12} \Omega$ were reported.

While the prior art conductive polymeric compositions may be generally satisfactory for their respective intended uses, many are quite polymer specific and are limited to the extent that other desirable properties are not readily conferred without compromising the electrical conductivity properties.

Similarly, the processability of many of these prior art electrically conductive polymeric compositions is limited only to thin film solvent based applications or only to thermoplastic moulding techniques.

It is an aim of the present invention to overcome or ameliorate at least some of the difficulties associated with prior art electroconductive polymer compositions and/or at least provide consumers with a more convenient choice.

SUMMARY OF THE INVENTION

According to one aspect of the invention there is provided an electroconductive polymer composition comprising:
 a curable liquid resin matrix;
 conductive nano-fibres;
 a particulate non-conductive phase discontinuously dispersed throughout said matrix, said composition characterized in that said conductive nano-fibres are dispersed throughout said matrix to establish a percolation threshold therein when said matrix is cured.

Suitably, said electroconductive polymer system comprises a fluid in an uncured state.

The liquid curable resin may be selected from an epoxy resin, an unsaturated polyester resin, a vinyl ester resin or a phenolic resin The conductive nano-fibres may be present in the composition in the range of from 1 to 30 wt %.

If required, said conductive nano-fibres may have a diameter in the range of from 0.05 to 10 μm and a length in the range of from 1 to 500 μm.

The conductive nano-fibres may be selected from carbon nano-fibres, carbon nano-fibres, metallic nano-fibres or non-conductive nano-fibres with an electrically conductive coating.

Preferably, the conductive nano-fibres are vapour grown carbon fibres (VGCF).

Suitably, said particulate non-conductive phase comprises a thermoplastic polymer.

The thermoplastic polymer may have a mean particle diameter in the range of from 0.1 to 100 μm.

The thermoplastic polymer may be selected from the group comprising:

crystalline polar thermoplastic polymers, crystalline non-polar thermoplastic polymers, non-crystalline non-polar thermoplastic polymers, non-crystalline polar thermoplastic polymers, copolymers thereof or any combination of the aforesaid polymers.

If required, said thermoplastic polymer may be present in said polymer composition in the range of from 0 to 70 wt %.

If required, said particulate non-conductive phase may comprise exfoliated particles of nano-clay.

Preferably, said exfoliated particles of nano-clay are intercalated with said liquid resin matrix.

The particles of nano-clay may be present in said polymer composition in the range of from 0 to 20 wt %.

According to another aspect of the invention there is provided a method for the manufacture of an electroconductive polymer composition wherein conductive nano-fibres and a particulate non-conductive phase are intensively mixed with a liquid curable resin, which polymer composition, when cured, forms a discontinuous non-conductive phase dispersed throughout a conductive phase in which a percolation threshold is established by the distribution of conductive nano-fibres therethrough.

Suitably, said conductive nano-fibres and said liquid curable resin are mixed prior to the addition of said particulate non-conductive phase.

If required, said particulate non-conductive phase may comprise a thermoplastics resin added in dry powder form.

Alternatively, said particulate non-conductive phase may comprise exfoliated nano-clay particles intercalated with said liquid curable resin.

The particulate non-conductive phase comprising exfoliated nano-clay particles intercalated with liquid curable resin may be added to a mixture of said liquid curable resin and said conductive nano-fibres.

Alternatively, said liquid resin may be formed as a dispersion of exfoliated nano-clay intercalated with said liquid curable resin prior to addition of said conductive nano-fibres.

Preferably, said dispersion is formed by treatment of pristine clay with water to swell said clay, exchanging said water with an organic solvent while maintaining said clay in a swollen state in a slurry with said organic solvent, treating said solvent exchanged swollen clay slurry with a modifier selected from a surfactant, a coupling agent, a compatibilizer or any combination thereof and subsequently mixing said slurry with a liquid curable resin and thereafter removing said solvent from said dispersion.

BRIEF DESCRIPTION OF THE DRAWINGS

In order that the various aspects of the invention may be fully understood and put into practical effect, exemplary embodiments will now be described with reference to the accompanying drawings in which.

DETAILED DESCRIPTION OF THE INVENTION

Figure 1:
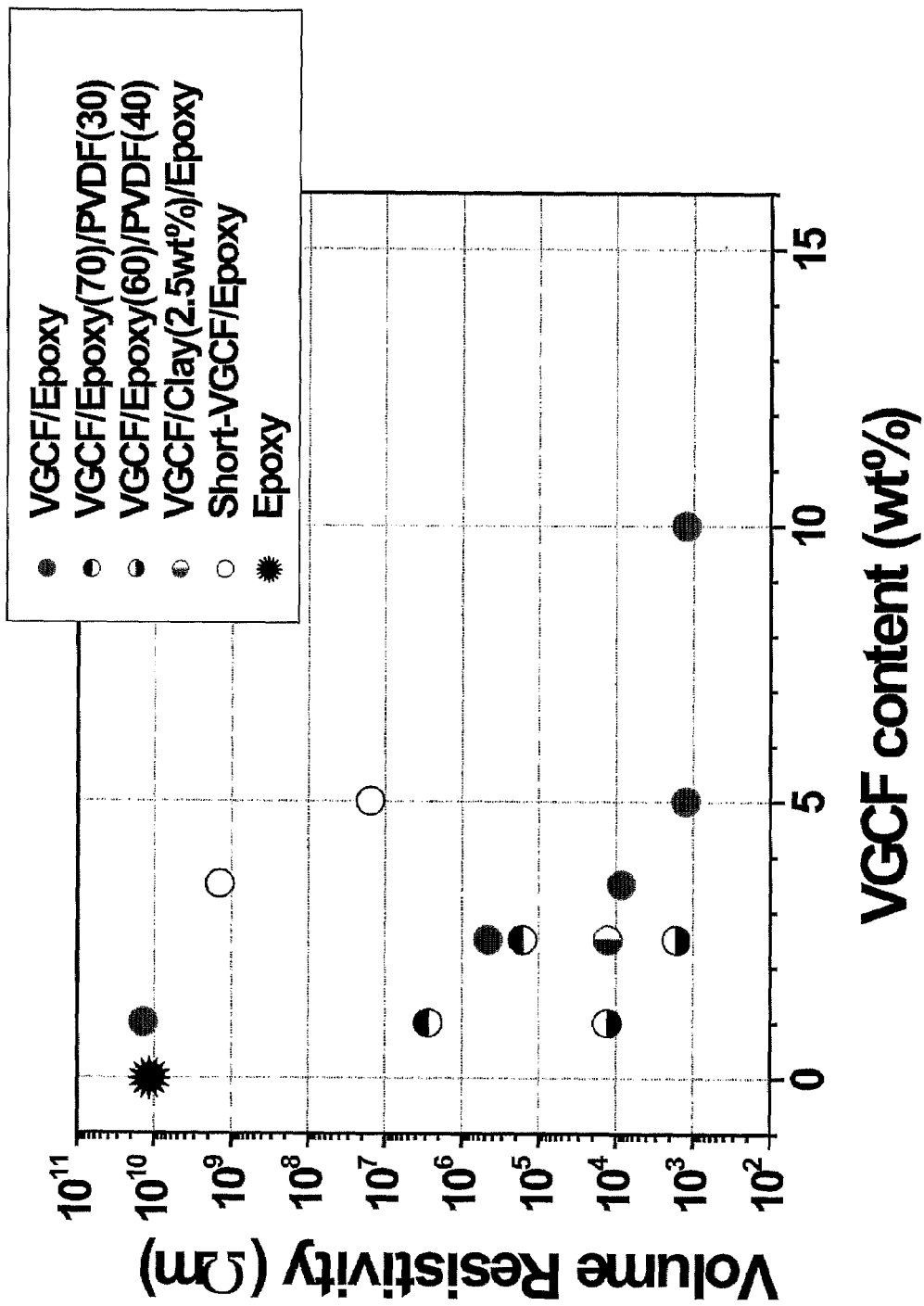
FIG. 1 is a graphical representation of the relationship between volume resistivity and VGCF filler content in epoxy-based electroconductive polymer compositions according to the invention.

The present inventors have sought to exploit the known superior properties of conductive nano-fibres over conventional electroconductive fillers such as carbon black or metallic particle fillers to create, in a cost effective manner, electroconductive thermosetting compositions in a convenient form for a wide range of applications.

The inventors have found that by incorporating non-conductive fillers into a liquid curable resin matrix having a conductive nano-fibres dispersed throughout the matrix, a liquid or paste format provides a wide range of options in material selection and a wider range of processing applications from thin films to thick plates or blocks readily cast or moulded from the compositions according to the invention.

The various embodiments of the invention provide good electrical conductivity values at relatively low concentrations of electroconductive filler without sacrificing other physical properties or processing characteristics. The electroconductive properties of compositions according to the invention find use in applications where volume resistivity values of <$10^6$ Ωm provide a resistance to electrostatic discharge and volume resistivity values of <$10^3$ Ωm have applications where electromagnetic interference shielding properties are desirable.

The liquid curable resins utilized for the electroconductive matrix may be selected from a wide range of known such liquid curable resins. Specific non-limiting examples of suitable liquid curable resins include epoxy resins, vinyl ester resins, unsaturated polyester resins, phenolic resins and the like.

Conductive nano-fibres for use in the present invention are commonly known in the art and may be selected from carbon nano-fibres, carbon nano-fibres (also known as vapour grown carbon fibres (VGCF)), milled carbon fibres, metallic nano-fibres or non-conductive non-metallic particles having an electrically conductive coating over a substantial portion of their surface.

Vapour grown carbon fibre (VGCF) fillers useful in the present invention can have fibre diameters in the range of from 0.05 to 10 μm and a length in the range of from 1 to 500 μm. The amount of conductive nano-fibre incorporated into electrically conductive compositions according to the invention can be in the range of from 1 to 30 wt %, preferably in the range of from 1 to 2.5 wt %.

A broad range of particulate non-conductive thermoplastic polymers may be employed in the present invention as a non-conductive filler component. Specific non-limiting examples include crystalline polar thermoplastic polymers, crystalline non-polar thermoplastic polymers, non-crystalline polar thermoplastic polymers, non-crystalline non-polar thermoplastic polymers, copolymers thereof or any combination of the aforesaid polymers. Particulate thermoplastic polymers may be employed in the present invention in the range of from 10 to 80 wt %, preferably in the range of from 45 to 70 wt %.

The particulate non-conductive particles of nano-clay are preferably minimally modified exfoliated pristine clays selected from swellable layered clay materials well known in the field of nanocomposite polymeric compounds. Non-limiting examples may include natural or synthetic phyllosilicates, particularly smectite clays such as montmorillonite, nontronite, beidellite, volkonskoite, laponite, hectorite, saponite, sauconite, magadite, kenyaite, stevensite and the like. In contrast with known organoclays which usually contain from 25 to 45 wt % of an organic modifier, minimally modified clays used in accordance with the invention comprise from about 0.05 to 15 wt % and thus for the purpose of distinguishing from the prior art are referred to herein as "minimally modified" nano-clays. Such minimally modified nano-clays are significantly less expensive than conventional nano-clays and possess the added advantage that less low molecular weight organic residues are found in nanocomposite polymers comprising such minimally modified organoclays. The presence of low molecular weight organic residues in nanocomposite polymers is known to substantially reduce the physical properties thereof.

Example 1

Vapour grown carbon fibres (VGCF) from Showa Denko were mixed with a liquid bisphenol-A diglycidyl ether (DGEBA) type of epoxy resin D.E.R. 332 from Dow Plastics, wherein the VGCF filler was present in the epoxy resin in amounts of from 1 to 10 wt %. The VGCF has a fibre diameter of about 100 nm and a length in the range of from 10 to 20 µm The liquid epoxy resin/VGCF filler mixture was intensively mixed and simultaneously diarated in a Thinky Mixer AR-250 from Thinky Corporation in Japan.

To a portion of the mixture was then added a stoichiometric quantity of Ethacure 100-LC, curing agent in the ratio of 1 part by weight curing agent and 3.8 parts of epoxy resin. Ethacure 100-LC is available from Albermarle Corporation of United States of America. VGCF containing epoxy sheets 0.5 mm thick were then moulded and cured at 100° C. for two hours then 180° C. for five hours. Additional comparative samples containing short fibre length VGCF filler in the same ratio were prepared in an identical fashion.

Example 2

Quantities of uncured epoxy resin containing 1 wt % and 2.5 wt % respectively of VGCF filler prepared in accordance with Example 1 were mixed with Poly (vinylidene fluoride) (PVDF) powdered resin 301F from Atofina in the ratios 30 to 70 wt % powder/VGCF filled epoxy resin, and 40 to 60 wt % powder/VGCF filled resin and intensively mixed and deaerated in a Thinky Mixer AR-250 as in Example 1. Thereafter 0.5 mm thick sheets of the mixture were moulded and cured under the same conditions described in Example 1.

Example 3

Sodium montmorillonite, a pristine nano-clay, (PGW) from Nanocor Inc., with a cation exchange capacity (CEC) of 145 mequiv/100 g, an aspect ratio of 200-400, a d001 spacing of 12.5 Å and a specific density of 2.6 g/cm3 was used in this example. The pristine clay (4 g) was dispersed into 120 mL of deionized water to form a suspension, which was stirred at room temperature for twenty-four hours and sonicated for thirty minutes. The suspension was poured in 800 mL of ethanol and stirred vigorously for five minutes. A white precipitate formed, which was filtered and washed three times with ethanol. The wet product was added to 80 mL of ethanol to form a clay/ethanol slurry. A modifier, 3-glycidoxypropyltrimethoxysilane (GPTS) (0.2 g) was added to the slurry. The slurry was stirred for ten hours and sonicated for thirty minutes at room temperature. Afterward, the slurry was mixed with specific quantities of the liquid epoxy resin of Example 1 at 50° C. and stirred for two hours. Ethanol was evaporated by drying in a vacuum oven at 50° C., 3 mmHg for forty-eight hours to obtain a paste-like nanocomposite mixture comprising 2.5 wt % of minimally modified exfoliated pristine nano-clay dispersed within the liquid epoxy resin whereby the nano-clay particles were intercalated with the epoxy resin. To this paste-like mixture was added 2.5 wt % of VGCF filler and the admixture was intensively mixed with a Thinky Mixer AR-250 as in Example 1. Then a stoichiometric quantity (Der332:100-LC) 3.8:1 by weight) of the curing agent of Example 1 was added, and the mixture was stirred and degassed under vacuum at 75° C. for sixty minutes in the Thinky Mixer AR-250. Finally, the mixture was cured at 100° C. for two hours and post-cured at 180° C. for five hours to form 0.5 mm thick sheets as in Example 1.

Volume resistivity of each of the cured samples taken in Examples 1 to 3 was then measured using a resistivity test fixture (Model 8009, Keithley) and an electrometer/high resistance meter (Model 6517A, Keithley) according to American Standard Test Method ASTM D257. As shown in FIG. 1, the samples of Examples 1 to 3 compared favourably to an epoxy resin having VGCF filler content of 1 wt %, and epoxy resin having a short fibre length (<20 µm) VGCF filler at concentrations of 3.5 and 5 wt %, and straight epoxy comparative test samples although with VGCF/epoxy mixtures containing from 5 to 10 wt % of VGCF filler, resistivity values of $10^3$ Ωm are obtainable.

Importantly however, the volume resistivity values exhibited in FIG. 1 show that with the addition of particulate non-conductive fillers, the quantity of conductive nano-fibres required to obtain volume resistivities in a desired range can be reduced to between 1 to 2.5% with substantial cost savings arising therefrom. The nanocomposite composition according to the invention has the additional advantage of a highly exfoliated nanocomposite, namely high strength and modulus, good barrier properties, fire retardance, scratch resistance and the like.

Figure 2:
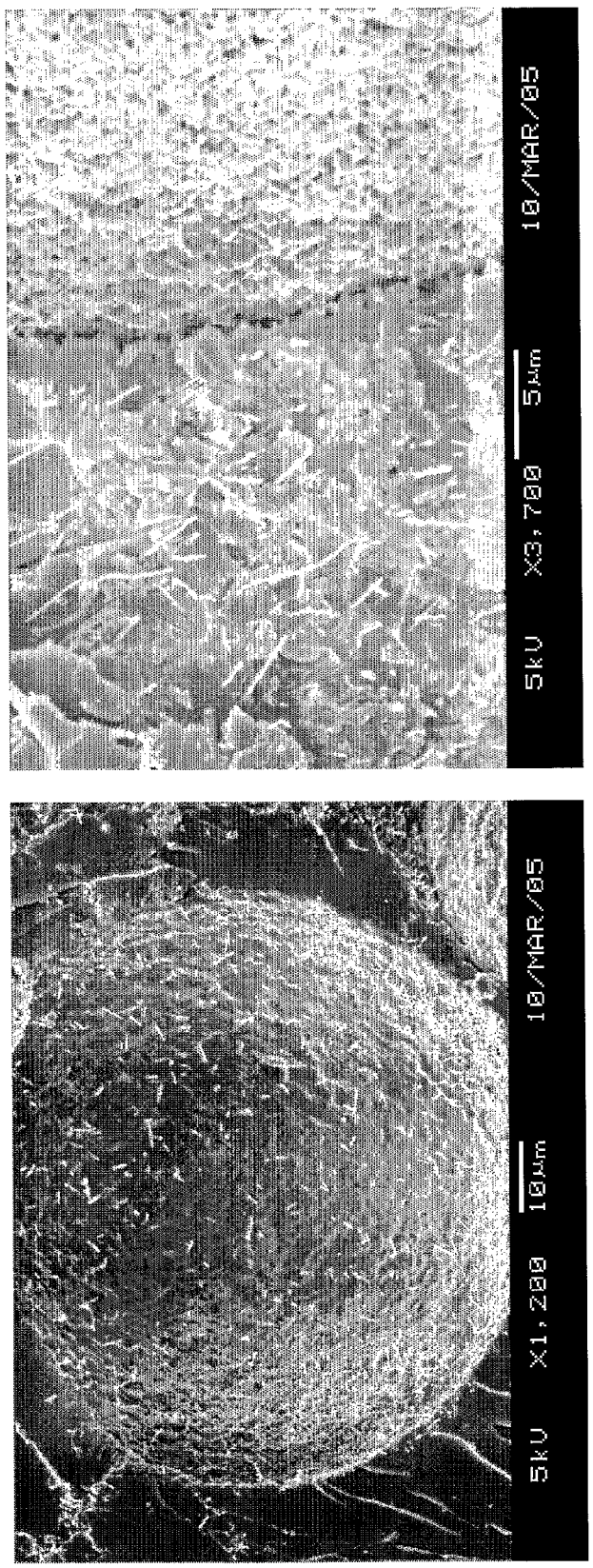
FIG. 2 is a scanning electromicrograph of an epoxy resin matrix/VGCF filler/particulate thermoplastic resin composition ac cording to the invention.

FIG. 2 shows SEM micrographs of one of the electrically conductive compositions of Example 2. This composition comprised 60 wt % epoxy resin, 40 wt % PVDF and 2.5 wt % VGCF filler. As can ber seen, the VGCF filler particles are located in the interface region between the PVDF particles and epoxy matrix, or in the matrix and thus form an effective VGCF network with high conductivity even although the VGCF filler composite ratio is very small.

Figure 3:
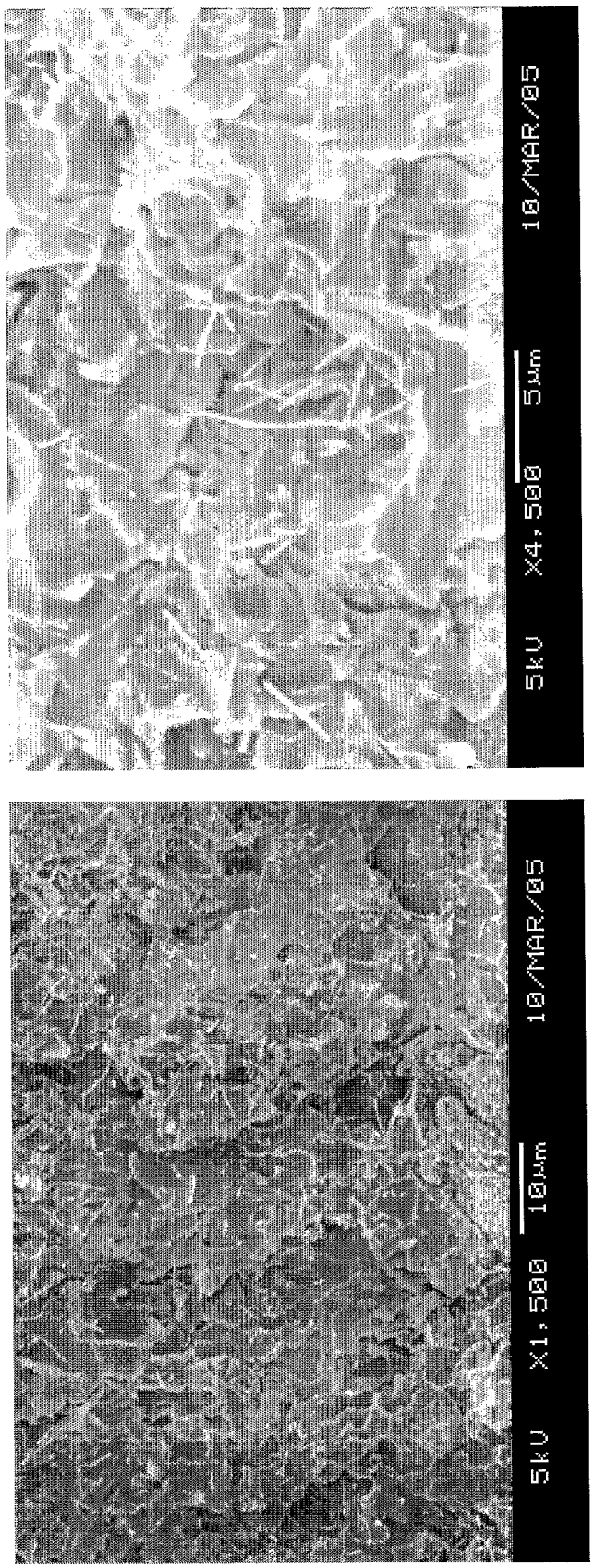
FIG. 3 is a scanning electromicrograph of an epoxy resin matrix/VGCF filler/nano-clay composition according to the invention.

FIG. 3 shows SEM micrographs of the electrically conductive composition of Example 3. This composition comprised epoxy resin containing 2.5 wt % of exfoliated minimally modified pristine nano-clay and 2.5 wt % of VGCF filler. These SEM micrographs clearly show the preferential dispersion of the VGCF filler in the polymeric matrix.

Figure 4:
FIG. 4 is a transmission electromicrograph of an epoxy resin matrix/VGCF filler/nano-clay composition according to the invention.
Figure 4:
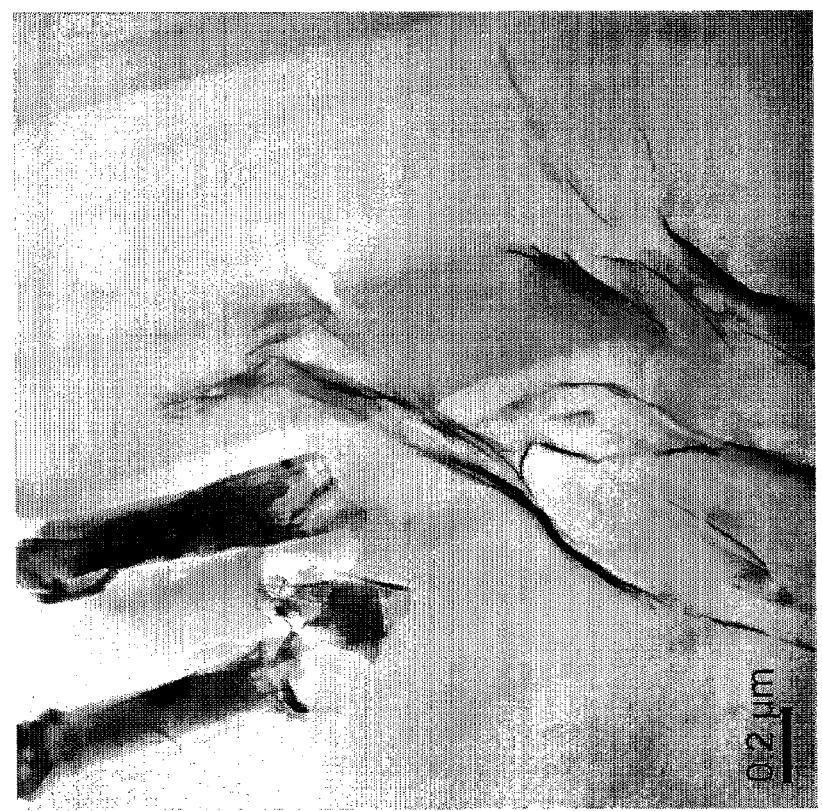

FIG. 4 shows TEM micrographs of the electrically conductive composition of Example 3, namely epoxy resin containing 2.5 wt % of exfoliated minimally modified pristine nano-clay and 2.5 wt % of VGCF filler. These micrographs show that the clay is highly exfoliated and that the clay particles are uniformly dispersed in the epoxy matrix. The conductive nano-fibre particles are not dispersed in the clay rich regions thereby creating an effective conductive nano-fibre network between clay rich regions in the composite matrix.

It readily will be apparent to a person skilled in the art that many modifications or adaptations may be made to the conductive thermosetting polymeric compositions according to the embodiments of the invention without departing from the spirit and scope thereof.

Similarly, it readily will be apparent that conductive nanocomposites according to the invention are relatively cost effective in that volume resistivities of $10^3$ Ωm or less can be obtained with relatively low concentrations of conductive nano-fibres. Conductive compositions according to the invention will have application in a wide range of products where good antistatic and good electromagnetic interference shielding properties are required. Such applications may include fuel lines, tanks and containers in vehicles and aircraft, antistatic transport and packaging materials and components for microchip handling. Other applications may include casings or housings for electronic devices including mobile telephones, mobile computers, PDA's and the like.

A particular advantage accruing from the invention is the flexibility afforded by having the uncured composition in a paste form. This permits moulding of small and large components as well as thin film applications such as paints or surface coatings for antistatic application and even transparent or translucent conductive coatings on display systems.

The invention claimed is:

1. An electroconductive polymer composition comprising:
   a curable liquid resin matrix;
   conductive nano-fibres; and,
   a particulate non-conductive phase selected from the group consisting of a particulate nano-clay containing from about 0.05 to 15 wt % organic modifier and a particulate thermoplastic polymer, said particulate non-conductive phase discontinuously dispersed throughout said matrix, said composition characterized in that said conductive nano-fibres are dispersed throughout said matrix to establish a percolation threshold therein when said matrix is cured.

2. A composition according to claim 1 wherein said electroconductive polymer composition comprises a fluid in an uncured state.

3. A composition according to claim 1 wherein said curable liquid resin matrix is selected from the group consisting of an epoxy resin, an unsaturated polyester resin, a vinyl ester resin and a phenolic resin.

4. A composition according to claim 1 wherein said conductive nano-fibres are selected from the group consisting of carbon nano-tubes, carbon nano-fibres, metallic nano-fibres and non-conductive nano-fibres with an electrically conductive coating.

5. A composition according to claim 4 wherein said conductive nano-fibres are vapour grown carbon fibre (VGCF).

6. A composition according to claim 5 wherein said conductive nano-fibres have a diameter in the range of from 0.05 to 10 μm and a length in the range of from 1 to 500 μm.

7. A composition according to claim 6 wherein said conductive nano-fibres are present in said electroconductive polymer composition in the range of from 1 to 30 wt %.

8. A composition according to claim 1 wherein said particles of nano-clay are intercalated with said curable liquid resin matrix.

9. A composition according to claim 1 wherein said particles of nano-clay are present in said electroconductive polymer composition in the range of from 1 to 20 wt %.

10. A composition according to claim 1 wherein said particulate thermoplastic polymer has a mean particle diameter in the range of from 0.1 to 100 μm.

11. A composition according to claim 1 wherein said particulate thermoplastic polymer is selected from the group consisting of crystalline polar thermoplastic polymers, crystalline non-polar thermoplastic polymers, non-crystalline non-polar thermoplastic polymers, non-crystalline polar thermoplastic polymers and copolymers thereof.

12. A composition according to claim 1 wherein said particulate thermoplastic polymer is present in said electroconductive polymer composition in the range of from 1 to 70 wt %.

13. A method for the manufacture of an electroconductive polymer composition according to claim 1 wherein conductive nano-fibres and a particulate non-conductive phase are intensively mixed with a liquid curable resin, which polymer composition, when cured, forms a discontinuous non-conductive phase dispersed throughout a conductive phase in which a percolation threshold is established by distribution of conductive nano-fibres therethrough.

14. A method according to claim 13 wherein said conductive nano-fibres and said liquid curable resin are mixed prior to the addition of said particulate non-conductive phase.

15. A method according to claim 13 wherein said particulate non-conductive phase comprises a thermoplastics resin added in dry powder form.

16. A method according to claim 15 wherein said particulate non-conductive phase comprising exfoliated nano-clay particles intercalated with liquid curable resin is added to a mixture of said liquid curable resin and said conductive nano-fibres.

17. A method according to claim 15 wherein said liquid curable resin is formed as a dispersion of exfoliated nano-clay intercalated with said liquid curable resin prior to addition of said conductive nano-fibres.

18. A method as claimed in claim 17 wherein said dispersion is formed by treatment of pristine clay with water to swell said clay, exchanging said water with an organic solvent while maintaining said clay in a swollen state in a slurry with said organic solvent, treating said solvent exchanged swollen clay slurry with a modifier selected from a surfactant, a coupling agent, a compatibilizer or any combination thereof and subsequently mixing said slurry with a liquid curable resin and thereafter removing said solvent from said dispersion.

19. A method according to claim 13 wherein said particulate non-conductive phase comprises a thermoplastics resin added in dry powder form.

* * * * *